US012316112B2

(12) United States Patent
Chowdhury et al.

(10) Patent No.: US 12,316,112 B2
(45) Date of Patent: May 27, 2025

(54) BREAKER CONTROL UNITS AND RELATED SYSTEMS AND METHODS

(71) Applicant: Schweitzer Engineering Laboratories, Inc., Pullman, WA (US)

(72) Inventors: Ritwik Chowdhury, Charlotte, NC (US); Dale S. Finney, Little Bras D'or (CA); Normann Fischer, Colfax, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 454 days.

(21) Appl. No.: 17/812,041

(22) Filed: Jul. 12, 2022

(65) Prior Publication Data

US 2024/0022112 A1  Jan. 18, 2024

(51) Int. Cl.
*H02J 13/00* (2006.01)
*H02H 1/00* (2006.01)

(52) U.S. Cl.
CPC ..... *H02J 13/00036* (2020.01); *H02H 1/0061* (2013.01); *H02J 13/00002* (2020.01)

(58) Field of Classification Search
CPC ........ H02B 1/30; H02H 1/0061; H02H 3/021; H02H 7/26; H02J 13/00002;
(Continued)

(56) References Cited

U.S. PATENT DOCUMENTS 2,209,810 A  7/1940 Cordroy
3,401,304 A  9/1968 Woodworth
(Continued)

FOREIGN PATENT DOCUMENTS

CN  115218963  10/2022
JP  2008218221 A * 9/2008
WO  2022144165  7/2022

OTHER PUBLICATIONS

Tan "Residual Flux Estimation Method for Three-Phase Transformers Without Zero-Sequence Circuit on the Switch-Off Side". 2016 IEEE PES Asia-Pacific Power and Energy Engineering Conference (APPEEC). Retrieved from Internet:<https://https://ieeexplore.ieee.org/stamp/stamp.jsp?tp=&arnumber=7779821> 2016.
(Continued)

*Primary Examiner* — Chun Cao
(74) *Attorney, Agent, or Firm* — Jared L. Cherry

(57) ABSTRACT

Breaker control units (BCUs) may include an output to selectively cause a circuit breaker (CB) to open and close a circuit, a voltage input to monitor a voltage of at least one of a bus and a line, a processor to calculate a point-on-wave switching time, and a remote input configured to be coupled to a remote intelligent electronic device (IED) to receive commands to selectively open and close the CB at a specified optimal time. Electric power systems may include such BCUs. Methods of switching CBs may include monitoring at least one of a bus and a line with a BCU and controlling switching of the CB at a predetermined point-on-wave value with onboard electronics of the BCU. The methods may additionally include calculating a trapped charge and/or a residual flux with an IED and causing the BCU to switch the CB at a specific optimum point-on-wave value.

19 Claims, 4 Drawing Sheets

(58) Field of Classification Search
CPC .... H02J 13/00036; A23L 19/01; A23L 27/14; A23L 27/16; A23L 27/63; A23L 29/30; A23V 2002/00; A23V 2300/24; A23V 2300/31
USPC ..................................................... 700/286
See application file for complete search history.

(56) References Cited

U.S. PATENT DOCUMENTS

| | | | |
|---|---|---|---|
| 3,546,534 A | 12/1970 | Kotos | |
| 3,558,984 A | 1/1971 | Smith | |
| 3,684,948 A | 8/1972 | Eissmann | |
| 3,870,926 A | 3/1975 | Hughes | |
| 4,322,768 A | 3/1982 | Maeda | |
| 4,327,390 A | 4/1982 | Despiney | |
| 4,329,638 A | 5/1982 | Le Maguet | |
| 4,757,263 A | 7/1988 | Cummings | |
| 4,914,382 A | 4/1990 | Douville | |
| 5,367,426 A | 11/1994 | Schweitzer | |
| 5,418,776 A | 5/1995 | Purkey | |
| 5,430,599 A | 7/1995 | Charpentier | |
| 5,563,459 A | 10/1996 | Kurosawa | |
| 5,627,415 A | 5/1997 | Charpentier | |
| 5,671,112 A | 9/1997 | Hu | |
| 5,703,745 A | 12/1997 | Roberts | |
| 5,805,395 A | 9/1998 | Hu | |
| 6,028,754 A | 2/2000 | Guzman | |
| 6,256,592 B1 | 7/2001 | Roberts | |
| 6,341,055 B1 | 1/2002 | Guzman-Casillas | |
| 6,356,421 B1 | 3/2002 | Guzman-Casillas | |
| 6,392,390 B1 | 5/2002 | Ito | |
| 6,456,947 B1 | 9/2002 | Adamiak | |
| 6,493,203 B1 | 12/2002 | Ito | |
| 6,518,767 B1 | 2/2003 | Roberts | |
| 6,571,182 B2 | 5/2003 | Adamiak | |
| 6,590,397 B2 | 7/2003 | Roberts | |
| 6,865,063 B2 | 3/2005 | Ball | |
| 6,879,917 B2 | 4/2005 | Turner | |
| 6,919,717 B2 | 7/2005 | Ghassemi | |
| 7,095,139 B2 | 8/2006 | Tsutada | |
| 7,345,863 B2 | 3/2008 | Fischer | |
| 7,425,778 B2 | 9/2008 | Labuschagne | |
| 7,469,190 B2 | 12/2008 | Bickel | |
| 7,472,026 B2 | 12/2008 | Premerlani | |
| 7,629,786 B2 | 12/2009 | Lee | |
| 7,696,648 B2 | 4/2010 | Kinoshita | |
| 7,812,615 B2 | 10/2010 | Gajic | |
| 7,880,343 B2 | 2/2011 | Kleinecke | |
| 7,982,341 B2 | 7/2011 | Kinoshita | |
| 8,008,810 B2 | 8/2011 | Kinoshita | |
| 8,217,536 B2 | 7/2012 | Koshizuka | |
| 8,289,668 B2 | 10/2012 | Kasztenny | |
| 8,310,106 B2 | 11/2012 | Koshiduka | |
| 8,553,379 B2 | 10/2013 | Kasztenny | |
| 8,564,159 B2 | 10/2013 | Udagawa | |
| 8,750,008 B2 | 6/2014 | Sugiyama | |
| 8,878,391 B2 | 11/2014 | Taylor | |
| 9,008,982 B2 | 4/2015 | Tziouvaras | |
| 9,379,535 B2 | 6/2016 | Taylor | |
| 9,870,879 B2 | 1/2018 | Taillefer | |
| 10,096,993 B2 | 10/2018 | Taillefer | |
| 10,230,234 B2 | 3/2019 | Ijdir | |
| 2001/0012984 A1 | 8/2001 | Adamiak | |
| 2002/0101229 A1 | 8/2002 | Roberts | |
| 2004/0090726 A1 | 5/2004 | Ball | |
| 2005/0068792 A1 | 3/2005 | Yasumura | |
| 2007/0070565 A1 | 3/2007 | Benmouyal | |
| 2007/0290670 A1 | 12/2007 | Lee | |
| 2009/0059447 A1 | 3/2009 | Gajic | |
| 2009/0091867 A1 | 4/2009 | Guzman-Casillas | |
| 2009/0097173 A1 | 4/2009 | Kinoshita | |
| 2009/0251009 A1 | 10/2009 | Kleinecke | |
| 2010/0002348 A1 | 1/2010 | Donolo | |
| 2010/0039737 A1 | 2/2010 | Koshizuka | |
| 2010/0085668 A1 | 4/2010 | Kinoshita | |
| 2010/0141235 A1 | 6/2010 | Koshiduka | |
| 2011/0080053 A1 | 4/2011 | Urano | |
| 2012/0050937 A1* | 3/2012 | Saito | H01H 9/563 361/187 |
| 2013/0155553 A1 | 6/2013 | Kawasaki | |
| 2013/0176021 A1 | 7/2013 | Udagawa | |
| 2014/0002944 A1* | 1/2014 | Menezes | H01H 47/22 361/160 |
| 2022/0385058 A1* | 12/2022 | Benmouyal | H02H 7/04 |

OTHER PUBLICATIONS

Gabriel Benmouyal, et al., "A Unified Approach of Controlled Switching of Power Equipment," Oct. 2017.

Mahgoub O A: "Microcontroller-based switch for three-phase transformer inrush current minimization", Power Electronics Congress, 1996. Technical Proceedings. Ciep '96., V IEEE International Cuernavaca, Mexico Oct. 14-17, 1996, New York, NY, USA, IEEE, US Oct. 14, 1996 (Oct. 14, 1996), pp. 107-112.

Pachore Parvraj et al: "Flux Error Function Based Controlled Switching Method for Minimizing Inrush Current in 3-Phase Transformer", IEEE Transactions on Power Delivery, IEEE Service Center, New York, NY, US vol. 36, No. 2, May 18, 2020, pp. 870-879.

* cited by examiner

BREAKER CONTROL UNITS AND RELATED SYSTEMS AND METHODS

TECHNICAL FIELD

This disclosure relates to systems, devices, and methods for controlled switching of circuit breakers in electric power systems. More particularly, but not exclusively, this disclosure relates to breaker control units with independent functionality for locally controlled switching of circuit breakers that may be connected to separate intelligent electronic devices for more advanced controlled switching functionality.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

Figure 1:
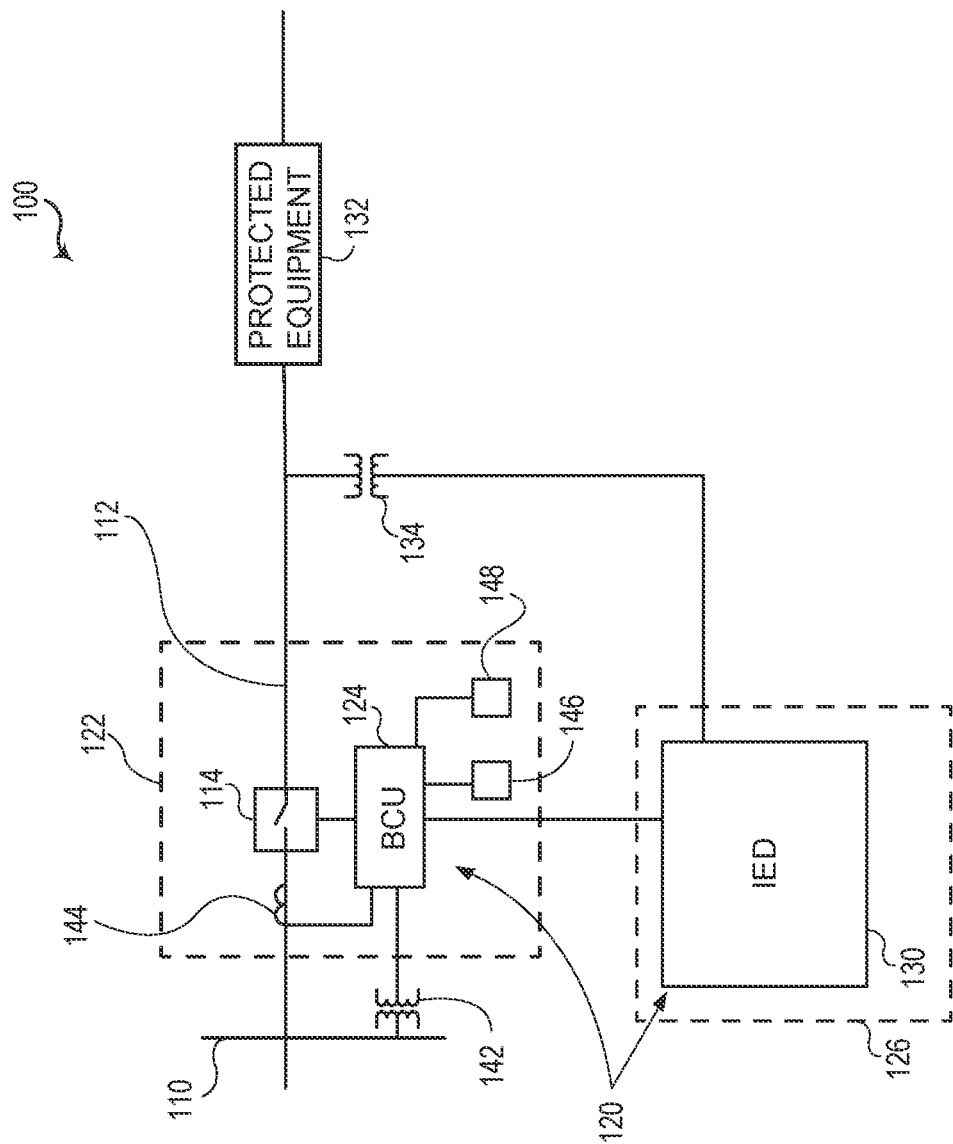
FIG. 1 illustrates a simplified diagram of a portion of an electric power system consistent with embodiments of the present disclosure.

Electric power systems are used to generate, transmit, and distribute electric power to loads, and serve as an important part of critical infrastructure. Electric power systems include equipment, such as generators, transmission and distribution lines, transformers, capacitor banks, and electrical substations, to provide electrical energy from sources to loads. In some cases, electric power systems and equipment may be monitored and protected by a variety of types of equipment. Such equipment may include sensors to monitor currents, voltages, phases, and other parameters of the electric power system. Such equipment may additionally include circuit breakers (CBs) to implement protective functions. The CBs may communicate with various other supervisory devices such as automation systems, monitoring systems, supervisory (SCADA) systems and other intelligent electronic devices (IEDs).

Many modern electric power systems implement point-on-wave switching, also known as controlled switching or synchronous switching. Point-on-wave switching involves opening or closing a CB at a specific instant in time that coincides with a certain value of the current or voltage that may vary cyclically over time in a sinusoidal fashion. In many instances, it may be desirable when opening a circuit breaker to have the breaker contacts far apart when the current value is at zero. Similar situations exist for closing a circuit breaker, wherein closing at a specific current or voltage value may be beneficial, such as to protect equipment and/or avoid disruption. For example, to avoid transient exchange currents that may result in inrush currents and/or loading currents of gas-insulated switchgear, the switching should be timed such that the voltage differences across a breaker are at a minimum at the time of switching.

Point-on-wave switching of CBs is typically wholly controlled by a supervisory system that is remote from the CBs and the breaker cabinet that houses the CBs. The inventors of the present disclosure, however, have developed improvements on electric power systems which may involve dividing a supervisory system into multiple modular components.

In some embodiments, a breaker control unit (BCU) located in a breaker cabinet may perform certain point-on-wave switching functions locally and independently from a remote supervisory system. In the breaker cabinet, much of the general work may be performed with a much smaller form-factor device. This device may only require the bus-voltage and possibly the breaker currents.

There are substantial benefits to such an arrangement. If the BCU resides remotely, such as in a control house, and trips or closes a CB via a copper cable, there would be a voltage drop across the cable. Such a change in voltage may affect the CB operating time to switch open or switch closed and that may require compensation by a controlled switching device. However, if the DC voltage on the trip and/or close coil is measured right at the breaker cabinet, there may be significant performance benefits. Additionally, by locating a BCU in the breaker cabinet also avoids many issues resultant from cable issues, such as a DC ground. Other measurements, such as temperature and pressure compensation, will also be available locally from within the breaker cabinet.

For point-on-wave switching that involves significant computation on IEDs that may be relatively sensitive equipment that may not be suited to the relatively harsh environmental conditions of a breaker cabinet, one or more remotely located IEDs may be connected to the BCU. For example, one or more IEDs may be located in a control house. Accordingly, one or more remote IEDs may send a trip or close command to the BCU. Additionally, a BCU located in the breaker cabinet with connectivity to one or more remote IEDs creates modularity benefits, such as the ability to switch out individual components, design portions of a system with fewer and/or less complex components, and/or add components to a system as desired.

Remote from the breaker cabinet, such as in a control house of a substation, an IED may perform advanced point-on-wave (or per-unit flux for transformers or trapped charge level for lines) calculations that require significant computational power and/or communication with other devices in the system. Such calculations may additionally require measurement of equipment statuses such as line or transformer-winding voltages. The IED may provide greater computational power than the BCU, and the IED may also have more communication capability (e.g., obtaining sampled values from a merging unit or communication with a SCADA system). Furthermore, if other signals are required, the IED may be sufficiently equipped to take information from other nodes in the electric power system to improve controlled switching performance.

Accordingly, in some embodiments, the bulk of the controlled switching functionality of CBs may be provided by the local BCU. For example, the bus voltage may be measured and monitored by the BCU and point-on-wave switching may be performed by utilizing the bus voltage. The CB status and other compensation factors such as supply voltage, temperature, and pressure may also be monitored and used by the BCU in the breaker cabinet to compensate for variation in breaker switching times due to these factors. The CB currents may be measured and monitored by the BCU in the breaker cabinet as well.

For optimal controlled switching functionality in some electric power systems, however, equipment voltage values may often be required. For example, transformer-controlled switching and transmission-line controlled switching may benefit from the measurement of the equipment voltage. Transformer controlled switching may be optimized by computing the residual flux calculated from the winding voltage measurements. Transmission-line controlled switching may be optimized by computing the trapped charged measured by the line's voltage transformers. In such instances, the flux and/or trapped charge may be communicated by the IED in the control house to the BCU in the breaker cabinet to prepare it for a controlled close operation requested by the user.

The embodiments of the disclosure will be best understood by reference to the drawings. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor do the steps need to be executed only once, unless otherwise specified.

In some cases, well-known features, structures, or operations are not shown or described in detail. Furthermore, the described features, structures, or operations may be combined in any suitable manner in one or more embodiments. It will also be readily understood that the components of the embodiments, as generally described and illustrated in the figures herein, could be arranged and designed in a wide variety of different configurations. For example, throughout this specification, any reference to "one embodiment," "an embodiment," or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Several aspects of the embodiments disclosed herein may be implemented as software modules or components. As used herein, a software module or component may include any type of computer instruction or computer-executable code located within a memory device that is operable in conjunction with appropriate hardware to implement the programmed instructions. A software module or component may, for instance, comprise one or more physical or logical blocks of computer instructions, which may be organized as a routine, program, object, component, data structure, etc., that performs one or more tasks or implements particular abstract data types.

In certain embodiments, a particular software module or component may comprise disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a non-transitory machine-readable medium having stored thereon instructions that may be used to program a computer or other electronic device to perform processes described herein. The non-transitory machine-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of media/machine-readable media suitable for storing electronic instructions. In some embodiments, the computer or another electronic device may include a processing device such as a microprocessor, microcontroller, logic circuitry, or the like. The processing device may further include one or more special purpose processing devices such as an application specific interface circuit (ASIC), PAL, PLA, PLD, field programmable gate array (FPGA), or any other customizable or programmable device.

FIG. 1 illustrates a simplified diagram of a portion of an electric power system 100 according to an embodiment of the present disclosure. The electric power system 100 may include a bus 110 and a protected equipment 132. A circuit breaker (CB) 114 may be connected to the bus 110 and provide switching capability to selectively open and close a circuit between the bus 110 and the protected equipment 132.

According to embodiments of the present disclosure, the electric power system 100 may include a distributed supervisory system 120 located in both a breaker cabinet 122 that may house the CB 114 and a breaker control unit (BCU) 124, and a remote structure, such as a control house 126 that may house additional supervisory equipment such as one or more intelligent electronic device (IED) 130.

By housing the BCU 124 within the breaker cabinet 122 along with the CB 114, the BCU 124 may monitor local conditions and provide substantial point-on-wave switching capability locally to the CB 114. In some embodiments, multiple breaker control units may be located in a breaker cabinet, each breaker control unit coupled to respective circuit breakers. In further embodiments, a single breaker control unit may be located in a breaker cabinet and configured to operate multiple circuit breakers within the breaker cabinet.

The IED 130 may provide more robust computational capabilities for more advanced controlled switching of the CB 114 such as for equipment 132 (e.g., a line or transformer). The protected equipment 132 may be monitored by the IED 130, although additional IEDs (not shown) may also be utilized. The IED 130 may obtain electric power system 100 information using one or more voltage transformer 134 and/or current transformer 136. In some embodiments, the IED 130 may be configured to monitor at least one of a generator, a transmission or distribution line, a transformer, a capacitor bank, etc.

As used herein, an IED (such as IED 130) may refer to any microprocessor-based device that monitors, controls, automates, and/or protects monitored equipment within the electric power system 100. Such devices may include, for example, remote terminal units, differential relays, transformer relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, and the like. The term IED may be used to describe an individual IED or a system comprising multiple IEDs.

Similarly, the BCU 124 may be coupled with one or more devices configured to measure the bus 110 voltage, such as a voltage transformer 142, and one or more devices to measure the CB 114 current, such as a current transformer 144. Additionally, the BCU 124 may be coupled with a temperature measurement device 146, such as a thermometer or thermocouple, and a pressure measurement device 148, such as a barometer, to monitor the conditions within the breaker cabinet 122.

Accordingly, utilizing such local measurements and possibly relatively limited computing capabilities, the BCU 124 may be capable of providing a substantial amount supervisory capability and point-on-wave switching capability to operate the CB 114 without any external input from the remote IED 130. In view of this, the electric power system 100 may have substantial supervisory capabilities, including point-on-wave switching capabilities in the event of a loss of communications between the breaker cabinet 122 and external supervisory equipment (e.g., the IED 130).

In light of the BCU 124 being configured to receive input from the IED 130, supervisory functionality that requires significant computational functionality and/or remote monitoring and communication, such as estimating residual flux and/or trapped charge values, may be provided by the IED 130.

Furthermore, by providing supervisory functions and point-on-wave capabilities by the BCU 124 located in the breaker cabinet 122 may provide a modular arrangement to improve cost efficiencies for the electric power system 100. For example, an electric power system may include CBs that do not require any more advanced supervisory monitoring and switching capabilities than can be provided by a BCU in the breaker cabinet, and relatively expensive IEDs and communication systems may not be required. Additionally, should such an electric power system be expanded to include equipment that would benefit from additional supervisory control and more complex point-on-wave switching capabilities, external IEDs may be added to the system as needed to communicate with the BCU and provide such additional supervisory controls.

The breaker cabinet 122 may be relatively small and may be located outdoors. While the breaker cabinet 122 may include passive environmental control (i.e., unpowered), such as air vents and shade structures, the breaker cabinet 122 may not include any active environmental controls (i.e., powered by energy), such as air conditioning, heating, dehumidification, or any other powered systems to control the environment. Accordingly, the environment inside and surrounding the breaker cabinet 122 may be relatively harsh, with relatively high temperatures, relatively low temperatures, and large fluctuations in humidity. This environment may not be suitable for sensitive IEDs that are capable of significant computational power and communication capabilities.

Unlike the breaker cabinet 122, the control house 126, may include active environmental controls. The control house 126, may include air conditioning, heating, and humidity regulating systems as required to compensate for the local environmental conditions. The breaker cabinet 122 may be subject to outdoor environmental conditions as the breaker cabinet 122 may typically only be accessed by humans for relatively rare and temporary circumstances such as emergencies, inspections, repairs, and the like. The control house 126, however, may be configured for regular use by humans to monitor and oversee operations of the electric power system 100, and may have actively controlled environmental conditions that may accommodate the IED 130.

The BCU 124 may be relatively small, robust, and capable of withstanding the environmental conditions within the breaker cabinet 122. To provide such a small and robust piece of equipment, the computational powers and communications capabilities may be somewhat limited, but sufficient to provide substantial supervisory capabilities and point-on-wave switching capability for the bulk of CB 114 switching operations.

Figure 2:
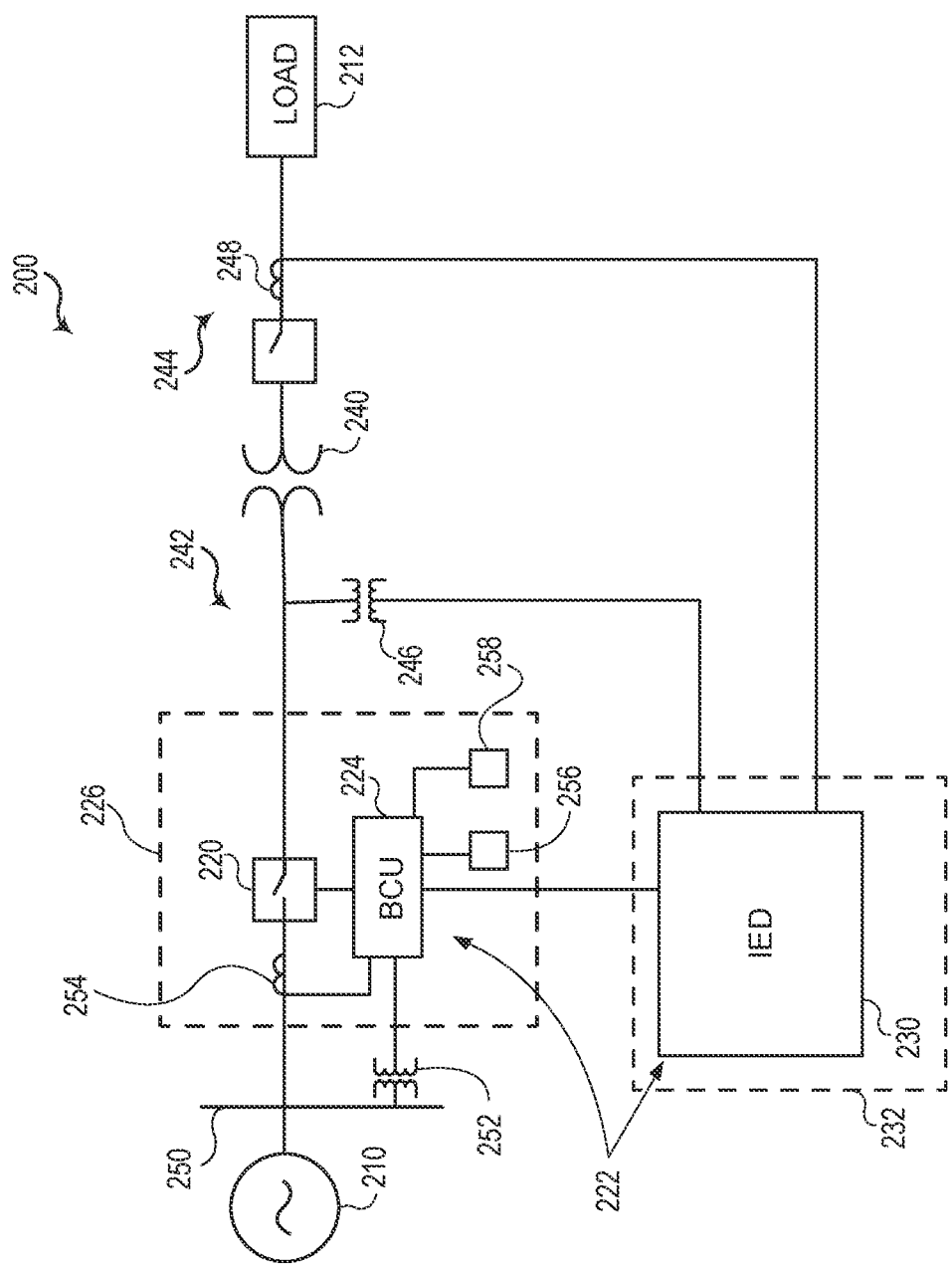
FIG. 2 is a one-line diagram of an electric power delivery system having an intelligent electronic device that uses residual flux to perform a controlled close to connect a transformer, in accordance with embodiments of the present disclosure.

FIG. 2 illustrates a one-line diagram of an electric power system 200 according to an embodiment of the present disclosure that includes a power source 210, such as a distributed generator, that provides power to one or more loads 212. Although illustrated in single-line form for purposes of simplicity, the electric power system 200 may be a multi-phase system, such as a three-phase electric power delivery system. Further, while a single power source 210 and load 212 are illustrated, any suitable number of power sources, loads, buses, transformers, and other equipment may be used in different power systems according to various embodiments of the disclosure.

The electric power system 200 includes at least one circuit breaker (CB) 220 that may be controlled for switching purposes by a distributed supervisory system 222. The distributed supervisory system 222 may include a breaker control unit (BCU) 224 that is located within a breaker cabinet 226 along with the CB 220. The distributed supervisory system 222 may additionally include at least one intelligent electronic device (IED) 230 located remotely, outside of the breaker cabinet 226, such as in a control house 232.

The electric power system 200 may include protected equipment that may be monitored and protected by the IED 230 in combination with the BCU 224 and CB 220. For example, the electric power system 200 may include a transformer 240, such as a step-up or step-down transformer, that communicatively connects a primary side 242 and a secondary side 244. Voltages on the primary side 242 of the transformer 240 produce a varying magnetic flux that induces a voltage on the secondary side 244 to allow electrical energy to be transformed to a level to power the load 212.

The transformer 240 may be monitored by the IED 230, although additional IEDs (e.g., IEDs on high-voltage and low-terminals of the transformer 240) may also be utilized. The IED 230 may obtain electric power system 200 information using at least one voltage transformer 246 and/or current transformers 248 and 254. The IED 230 may detect abnormal events of the transformer 240 using voltage signals of the voltage transformer 246 and/or may detect faults using current signals of the current transformers 248 and 254.

Similarly, the BCU 224 may be coupled with one or more devices configured to measure the voltage of a bus 250, such as a voltage transformer 252, and one or more devices to measure the CB 220 current, such as a current transformer 254. Additionally, the BCU 224 may be coupled with a temperature measurement device 256, such as a thermometer or thermocouple, and a pressure measurement device 258, such as a barometer, to monitor the conditions within the breaker cabinet 226.

Accordingly, utilizing such local measurements and relatively limited computing capabilities, the BCU 224 may be capable of providing a substantial amount supervisory capability and point-on-wave switching capability to operate the CB 220 without any external input from the remote IED 230. In view of this, the electric power system 200 may have substantial supervisory capabilities, including point-on-wave switching capabilities in the event of a loss of communications between the breaker cabinet 226 and external supervisory equipment (e.g., the IED 230).

In light of the BCU 224 being configured to receive input from the IED 230, supervisory functionality that requires significant computational functionality and/or remote monitoring and communication, such as estimating residual flux values, may be provided by the IED 230.

For example, the CB 220 may be opened, thereby disconnecting the transformer 240 from the power source 210 to allow an operator to service any equipment. Magnetic flux may remain on the transformer 240 upon disconnection.

Following maintenance/inspection, the transformer 240 may be re-energized by closing the CB 220. During closing of the CB 220, there may be a flux difference between the limbs of transformer 240 due to the residual magnetic flux remaining on the disconnected, de-energized transformer 240 and the prospective flux associated with the voltage of a line energized by the power source 210 upstream of the CB 220, which may cause a current inrush. Depending on the extent of this flux difference, the current inrush may result in voltage transients that may reduce the power quality of the electric power system 200, reduce reliability of the system protecting electric power system 200, and increase stress and reduce life of the transformer 240.

A point-on-wave switching value may be determined to eliminate or reduce this current inrush due to the residual flux of the transformer 240. To determine an estimate of the residual flux, however, requires the integration of instantaneous voltages measured on the electric power system 200, which may require significant computational power beyond the capabilities of the BCU 224. In view of this, the IED 230 may be utilized to compute the residual flux of the transformer 240. The IED 230 may then communicate with the BCU 224 and provide overriding instructions to the BCU 224 to switch the CB 220 at a specific point-on-wave value to compensate for the residual flux of the transformer 240.

Figure 3:
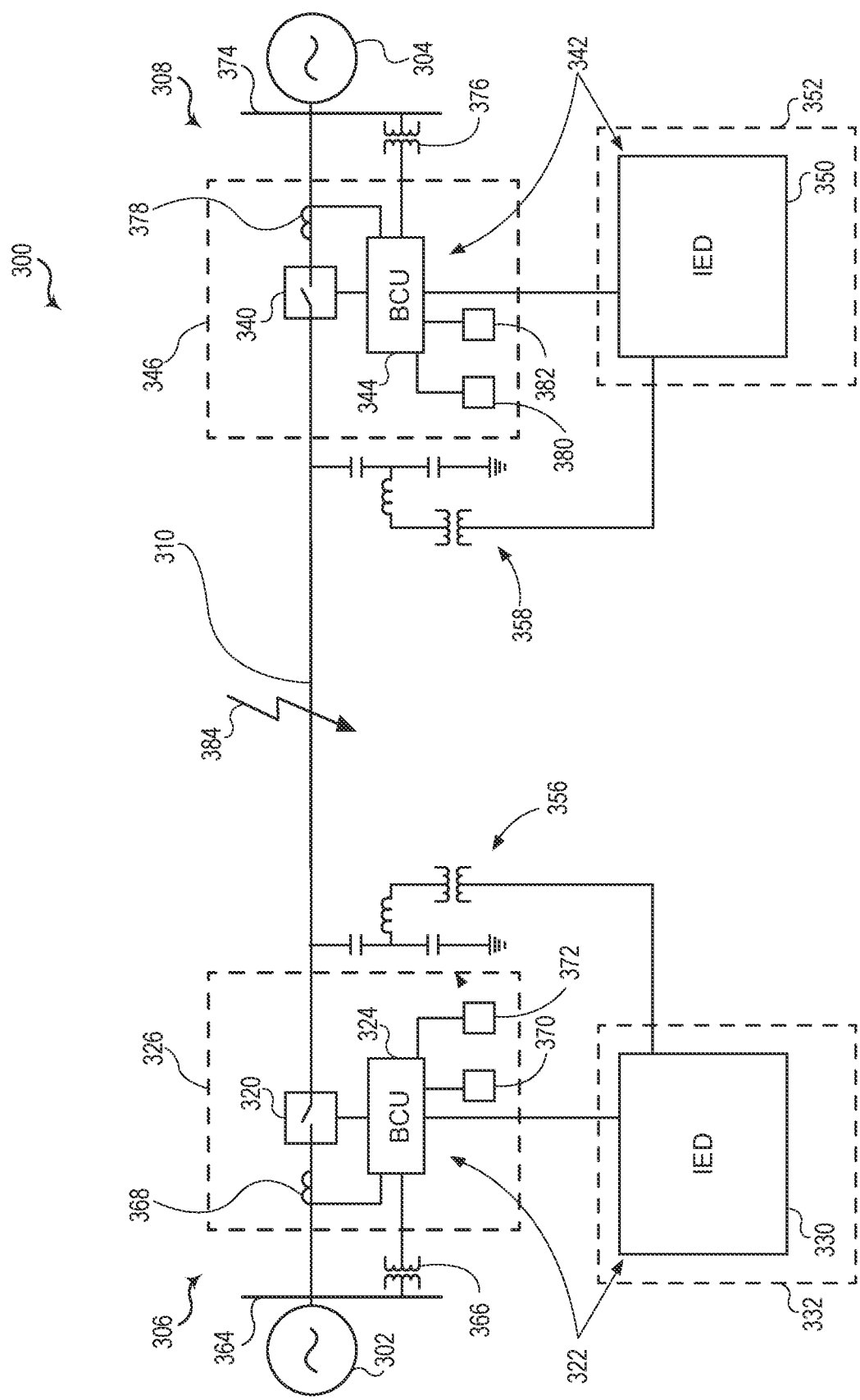
FIG. 3 is a one-line diagram of an electric power system having an intelligent electronic device that determines the trapped charge of a power line, in accordance with embodiments of the present disclosure.

FIG. 3 illustrates a one-line diagram of an electric power system 300 according to an embodiment of the present disclosure that includes power sources 302 and 304 that provide power to one or more loads (not shown). The electric power system 300 includes a power line 310, such as a transmission line, distribution line, or other power line, that connects a first substation 306 and a second substation 308. Although illustrated in single-line form for purposes of simplicity, electric power system 300 may be a multi-phase system, such as a three-phase electric power delivery system.

The first substation 306 includes at least one first circuit breaker (CB) 320 that may be controlled for switching purposes by a first distributed supervisory system 322. The first distributed supervisory system 322 may include a first breaker control unit (BCU) 324 that is located within a first breaker cabinet 326 along with the first CB 320. The first distributed supervisory system 322 may additionally include at least one first intelligent electronic device (IED) 330 located remotely, outside of the first breaker cabinet 326, such as in a first control house 332.

The second substation 308 includes at least one second circuit breaker (CB) 340 that may be controlled for switching purposes by a second distributed supervisory system 342. The second distributed supervisory system 342 may include a second breaker control unit (BCU) 344 that is located within a second breaker cabinet 346 along with the second CB 340. The second distributed supervisory system 342 may additionally include at least one second intelligent electronic device (IED) 350 located remotely, outside of the second breaker cabinet 346, such as in a second control house 352.

The power line 310 may be monitored by the IEDs 330 and 350 using capacitive voltage transformers 356, 358.

The first BCU 324 may be coupled with one or more devices configured to measure the voltage of a first bus 364, such as a voltage transformer 366, and one or more devices to measure the first CB 320 current, such as a current transformer 368. Additionally, the first BCU 324 may be coupled with a temperature measurement device 370, such as a thermometer or thermocouple, and a pressure measurement device 372, such as a barometer, to monitor the conditions within the first breaker cabinet 326.

Likewise, the second BCU 344 may be coupled with one or more devices configured to measure the voltage of a second bus 374, such as a voltage transformer 376, and one or more devices to measure the second CB 340 current, such as a current transformer 378. Additionally, the second BCU 344 may be coupled with a temperature measurement device 380, such as a thermometer or thermocouple, and a pressure measurement device 382, such as a barometer, to monitor the conditions within the second breaker cabinet 346.

Accordingly, utilizing such local measurements and relatively limited computing capabilities, the BCUs 324 and 344 may be capable of providing a substantial amount of supervisory capability and point-on-wave switching capability to operate the CBs 320 and 340 without any external input from the remote IEDs 330 and 350. In view of this, the electric power system 300 may have substantial supervisory capabilities, including point-on-wave switching capabilities in the event of a loss of communications between the breaker cabinets 326 and/or 346 and external supervisory equipment (e.g., the IEDs 330 and/or 350).

In light of the BCUs 324 and 344 being configured to receive input from the IEDs 330 and 350, supervisory functionality that requires significant computational functionality and/or remote monitoring and communication, such as estimating trapped charges, may be provided by the IEDs 330 and 350.

When a fault 384 occurs on the power line 310, the IEDs 330 and 350 may detect, for example, an overcurrent on the power line 310 via the current transformers 368, 378. The IEDs 330 and 350 may send a signal to the BCUs 324 and 344 to trip the CBs 320 and 340, respectively, thereby disconnecting the power line 310 from the power sources 302 and 304. While an overcurrent is used as an example, other conditions may be cause to disconnect the power line 310.

The IEDs 330 and 350 may send signals to the BCUs 324 and 344 to trip the CBs 320 and 340, respectively, at different times. For example, the second CB 340 may be disconnected before the first CB 320 due to a lower fault current contribution from source 304 relative to source 302, lower threshold overcurrent, a lower threshold current-over-time, a faster trip time, or detecting the overcurrent first. Upon disconnecting the second CB 340, the power line 310 may remain energized by the power being delivered from the power source 302. Thereafter, CB 320 may be opened to clear the fault 384. When the first CB 320 is disconnected, charge may remain on the power line 310, referred to as trapped charge.

Due to the trapped charge on the power line 310, there may be a voltage difference between the power line 310 and the power being provided by the power source 302. When the breaker 320 is closed thereafter to restore service to the line, voltage transients may result (e.g., traveling waves). Depending on the line characteristics, the voltage transients may exceed the designed ratings, such as basic insulation level, of the power line 310. In some cases, the voltage transients may cause what would otherwise be a transient fault to become a persistent fault that remains on the power line 310 due to exceeding the designed ratings of the power line 310.

The amount of trapped charge may be estimated by the first IED 330 using the voltage measurements received from the capacitive voltage transformer 356. The estimated trapped charge may then be used to obtain a closing point-on-wave value at which to close the first CB 320 to match the voltage of the remaining electric power system with the voltage associated with the trapped charge. The first IED 330 may then communicate with the first BCU 324 and provide overriding instructions to the first BCU 324 to switch the first CB 320 at a specific point-on-wave value to match the voltage of the remaining electric power system with the voltage associated with the trapped charge.

Accordingly, an electric power system according to an embodiment of the present disclosure may comprise a BCU and CB located in a breaker cabinet, the BCU configured to monitor at least one of a bus and a line and to coordinate a switching of the CB to correspond to a predetermined point-on-wave value at the time of switching. The electric power system may further comprise an IED in communication with the BCU, the IED configured to calculate an estimate of at least one of trapped charge and residual flux and communicate the estimate to the BCU to cause the CB to switch at a specific point-on-wave value at the time of switching.

In view of the foregoing, in some embodiments of the present disclosure, methods of switching circuit breakers of an electric power system may comprise monitoring at least one of a bus and a line with a breaker control unit (BCU) located locally to a circuit breaker (CB). The methods may further include controlling switching of the CB to correspond to a predetermined point-on-wave value at the time of switching with onboard electronics of the BCU, and calculating an estimate of at least one of trapped charge and residual flux with an intelligent electronic device (IED) and causing the BCU to switch the CB at a specific point-on-wave value at the time of switching with the IED.

In some embodiments, the methods may comprise monitoring equipment of an electric power system, such as at least one of a generator, a transmission or distribution line, a transformer, a capacitor bank, etc., with the IED.

In additional embodiments, the methods may comprise calculating an amount of trapped charge of a power line based on voltage measurements of the power line with the IED and instructing the BCU to switch the CB at a time corresponding to a point-on-wave associated with the amount of trapped charge with the IED.

In further embodiments, the methods may comprise monitoring voltage measurements of a transformer with the IED and determining a residual flux value of the transformer with the IED.

In yet further embodiments, the methods may comprise sending a signal from the IED to the BCU to connect the transformer to the electric power system by switching the CB based at least in part on the determined residual flux value and system voltage magnitude prior to closing.

Figure 4:
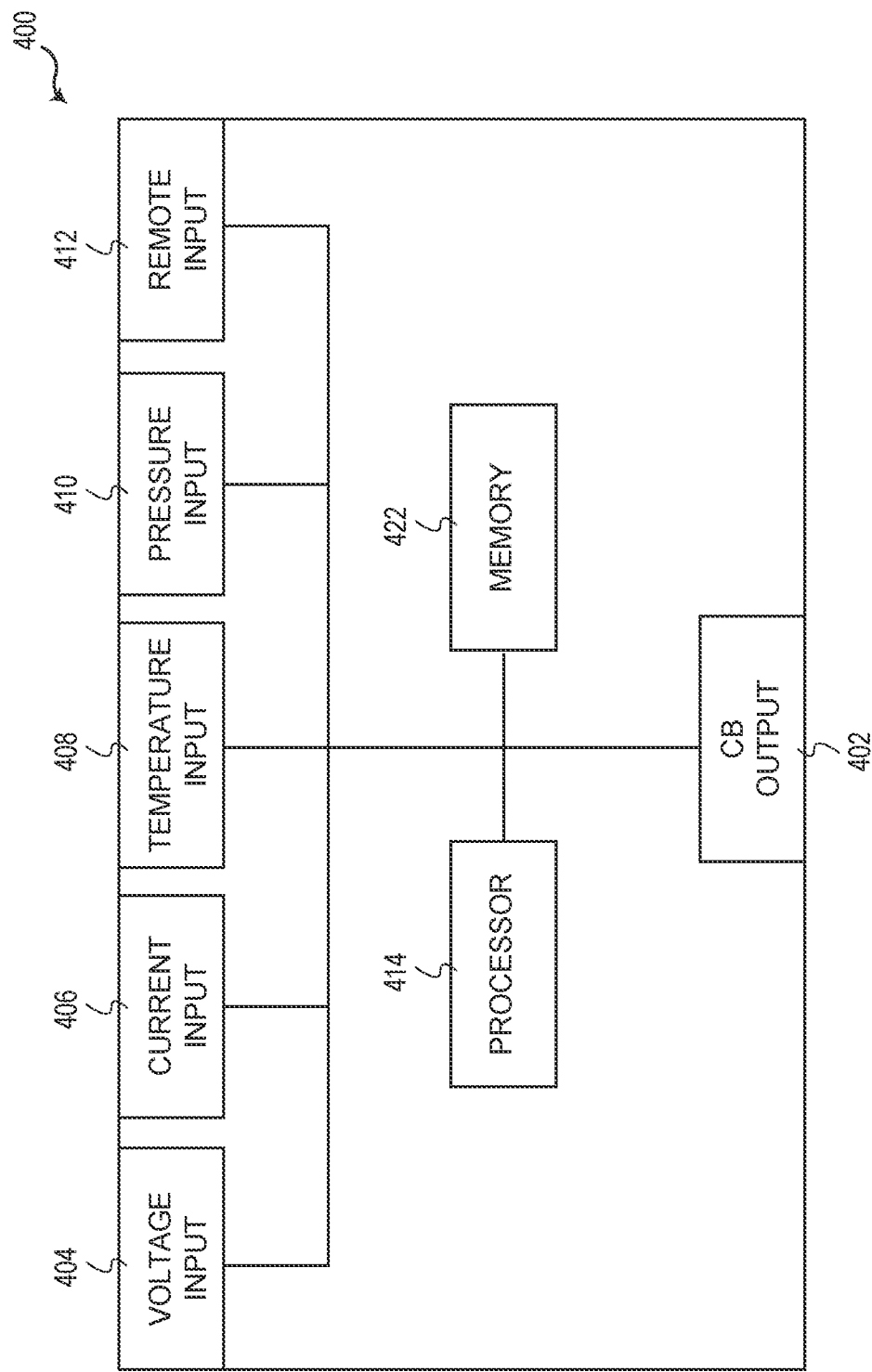
FIG. 4 illustrates a simplified circuit diagram representing a breaker control unit consistent with embodiments of the present disclosure.

FIG. 4 illustrates a simplified circuit diagram representing a breaker control unit (BCU) 400 consistent with embodiments of the present disclosure. The BCU 400 may be configured for placement in a breaker cabinet to be coupled to at least one circuit breaker (CB) locally within a breaker cabinet. Accordingly, the BCU 400 may be built to withstand outdoor environments within and surrounding a breaker cabinet.

The BCU 400 may include an output 402 configured to be coupled to a circuit breaker (CB) locally to cause the CB to selectively open and close a circuit. The BCU 400 may additionally include a voltage input 404 configured to be coupled to a voltage transformer to monitor a voltage of at least one of a bus and a line of an electric power system, and a current input 406 configured to be coupled to a current transformer to monitor a current of at least one of a bus and a line of an electric power system. The BCU 400 may additionally include a temperature input 408 configured to receive temperature data relating to the temperature within a circuit breaker cabinet, and a pressure input 410 configured to receive pressure data relating to a pressure within a circuit breaker cabinet.

The BCU 400 may include a remote input 412 configured to be coupled to a remote intelligent electronic device (IED) to receive commands to selectively open and close a connected CB at a specified time. Regardless, the BCU 400 may include a processor 414 configured to calculate an optimal point-on-wave switching time utilizing voltage data received from the voltage input 404, without the assistance of any data input from an IED.

The output 402, voltage input 404, current input 406, temperature input 408, pressure input 410, and remote input 412, may refer to ports, connectors, pins, and the like, along with circuitry 420, used to connect the BCU 400 to other devices.

The BCU 400 may further include a computer readable medium (e.g., memory 422) communicatively coupled to the processor 414, the output 402, voltage input 404, current input 406, temperature input 408, pressure input 410, and remote input 412 via the internal circuitry 420. The processor 414 may be embodied as one or more microprocessor, general-purpose integrated circuit, application specific integrated circuit (ASIC), field programmable gate array (FPGA), and/or other programmable logic devices. It should be noted that FIG. 4 is merely one example of a particular embodiment and is intended to illustrate the types of components that may be present in the BCU 400.

In the BCU 400, the processor 414 may be operably coupled with the memory 422 to perform various algorithms. Such programs or instructions executed by the processor 414 may be stored in any suitable article of manufacture that includes one or more tangible, computer-readable media at least collectively storing the instructions or routines, such as the random-access memory and the read-only memory.

Accordingly, the BCU 400 may be configured to perform point-on-wave switching of a CB without being coupled to or receiving any commands from an IED. In view of the capability of the BCU 400 of being able to receive external communications from an IED through the remote input 412, however, the processor 414 is not required to have sufficient processing power to perform integration and/or summation calculations required to estimate trapped charge and/or residual flux. Accordingly, the BCU 400 may rely on passive cooling and include weatherproofing of the internal components. For example, the internal components of the BCU 400 may be potted.

While specific embodiments and applications of the disclosure have been illustrated and described, it is to be understood that the disclosure is not limited to the precise configurations and components disclosed herein. Accordingly, many changes may be made to the details of the above-described embodiments without departing from the underlying principles of this disclosure. The scope of the present invention should, therefore, be determined only by the following claims.

What is claimed is:

1. A distributed supervisory system to monitor an electric power system, the distributed supervisory system comprising:
a breaker control unit (BCU) configured, the BCU comprising:
a circuit breaker (CB) output;
an electrical parameter interface to monitor at least one electrical parameter of the electric power system;
a remote input;
wherein the BCU is configured:
to be located in a breaker cabinet, and
to coordinate switching of the CB through the CB output to correspond to a predetermined point-on-wave value at a time of switching based on a signal received via the remote input; and
an intelligent electronic device (IED) configured to communicate with the BCU via the remote input, the IED configured:
to calculate an estimate of at least one of trapped charge and residual flux,
generate the signal to cause the CB to switch at a specific point-on-wave value,
transmit the signal to the BCU via the remote input.

2. The distributed supervisory system of claim 1, wherein the IED is further configured to monitor equipment of the electric power system.

3. The distributed supervisory system of claim 2, wherein the IED is further configured to monitor at least one additional piece of equipment in the electric power system.

4. The distributed supervisory system of claim 1, wherein the BCU is further configured to operate independently of the IED upon loss of communication between the IED and BCU to monitor the at least one of a bus and a line and to coordinate the switching of the CB to correspond to the predetermined point-on-wave value at the time of switching.

5. The distributed supervisory system of claim 1, wherein the IED is configured to provide overriding instructions to the BCU to control the switching of the CB.

6. The distributed supervisory system of claim 1, wherein the IED is configured to monitor voltage measurements of a transformer to determine a residual flux value of the transformer.

7. The distributed supervisory system of claim 6, wherein the IED is configured to send a signal to the BCU to connect the transformer to the electric power system based at least in part on the calculated residual flux value and system voltage measurement prior to closing.

8. The distributed supervisory system of claim 1, further comprising a current input configured to be coupled to a current transformer to monitor a current of at least one of a bus and a line of an electric power system.

9. The distributed supervisory system of claim 1, further comprising a temperature input configured to receive temperature data relating to a temperature within the circuit breaker cabinet.

10. The distributed supervisory system of claim 1, further comprising a pressure input configured to receive pressure data relating to a pressure within the circuit breaker cabinet.

11. The distributed supervisory system of claim 1, wherein the breaker control unit is configured to perform point-on-wave switching of the CB without being coupled to or receiving any commands from an IED.

12. The distributed supervisory system of claim 1, wherein the IED is remotely located from the BCU and the breaker cabinet.

13. A distributed supervisory system to monitor an electric power system, the distributed supervisory system comprising:
a breaker control unit (BCU) configured, the BCU comprising:
a circuit breaker (CB) output;
an electrical parameter interface to monitor at least one electrical parameter of the electric power system;
a remote input;
wherein the BCU is configured:
to be located in a breaker cabinet, and
to coordinate switching of the CB through the CB output to correspond to a predetermined point-on-wave value at a time of switching based on a signal received via the remote input; and
an intelligent electronic device (IED) configured to communicate with the BCU via the remote input, the IED configured:
to calculate an estimate of an amount of trapped charge of a power line based on voltage measurements of the power line and instruct the BCU to switch the CB at a time corresponding to a point-on-wave associated with the amount of trapped charge,
generate the signal to cause the CB to switch at a specific point-on-wave value,
transmit the signal to the BCU via the remote input.

14. A method of switching circuit breakers using a distributed supervisory system in an electric power system, the method comprising:
monitoring at least one of a bus and a line with a breaker control unit (BCU) located in a breaker cabinet and located proximate to a circuit breaker (CB);
controlling switching of the CB to correspond to a predetermined point-on-wave value at a time of switching with onboard electronics of the BCU; and
calculating an estimate of at least one of trapped charge and residual flux with an intelligent electronic device (IED) and causing the BCU to switch the CB at a specific point-on-wave value at the time of switching with the IED.

15. The method of claim 14, further comprising monitoring equipment of an electric power system with the IED.

16. The method of claim 15, further comprising monitoring at least one additional piece of equipment in the electric power system with the IED.

17. The method of claim 14, further comprising calculating an amount of trapped charge of a power line based on voltage measurements of the power line with the IED and instructing the BCU to switch the CB at a time corresponding to a point-on-wave associated with the amount of trapped charge with the IED.

18. The method of claim 14, further comprising monitoring voltage measurements of a transformer with the IED and determining a residual flux value of the transformer with the IED.

19. The method of claim 18, further comprising sending a signal from the IED to the BCU to connect the transformer to the electric power system by switching the CB based at least in part on the calculated residual flux value and system voltage magnitude prior to closing.

* * * * *